June 15, 1943.   J. C. McCUNE   2,322,043
BRAKE CYLINDER DEVICE
Filed Dec. 31, 1941

INVENTOR
Joseph C. McCune
BY
A. M. Higgins
ATTORNEY

Patented June 15, 1943

2,322,043

UNITED STATES PATENT OFFICE 2,322,043

BRAKE CYLINDER DEVICE

Joseph C. McCune, Edgewood, Pa., assignor to The Westinghouse Air Brake Company, Wilmerding, Pa., a corporation of Pennsylvania Application December 31, 1941, Serial No. 425,013

4 Claims. (Cl. 303—88)

This invention relates to brake cylinders for fluid pressure brake systems, and more particularly to a brake cylinder device of the type suitable for use in actuating a disk brake mechanism for a railway vehicle.

In my copending application Serial No. 407,554, filed in the United States Patent Office on August 20, 1941, there is disclosed an improved disk brake equipment, in which the power for effecting application of the braking elements is produced by a plurality of relatively small brake cylinders. Each of these brake cylinders has been designed to provide maximum efficiency in operating the associated elements of the braking equipment described in that application and comprises a cylindrical casing which is open at one end to receive a piston that is subject to the pressure of fluid in a pressure chamber for controlling operation of a brake applying member. With this construction, the open end of the brake cylinder is naturally exposed to the action of dust and moisture encountered under service conditions, unless provided with means for preventing access of foreign matter into the device.

It is an object of this invention to provide a brake cylinder device of the above type embodying means for preventing dust or moisture from entering the operating portion of the mechanism, while permitting escape of any fluid under pressure that may be entrapped at the non-pressure side of the usual piston during operation.

Figure 1:
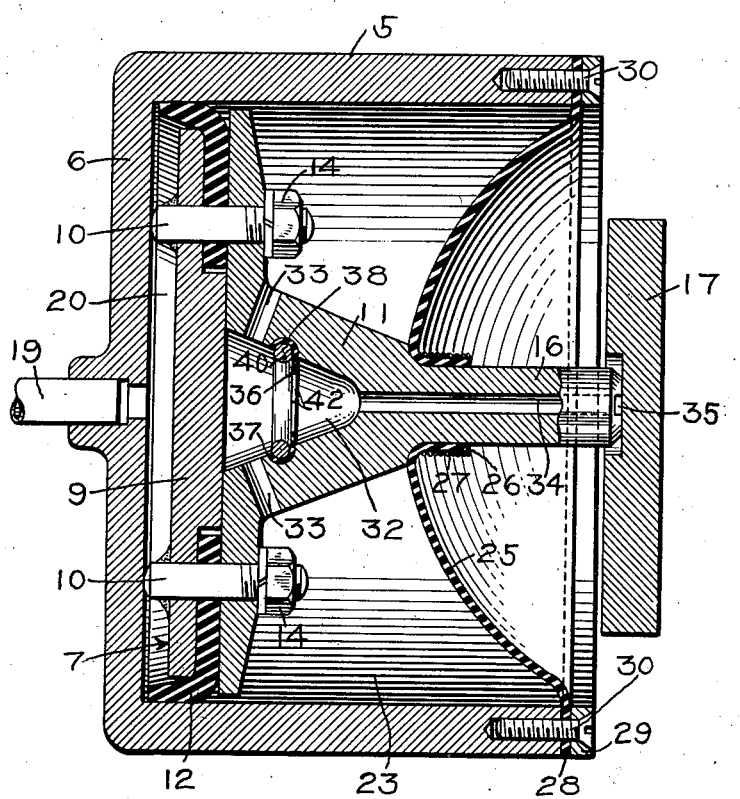
Figure 2:
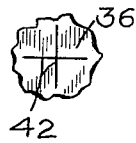

Other objects and advantages of the invention will appear in the following more detailed description thereof, taken in connection with the accompanying drawing, in which Fig. 1 is a diagrammatic sectional view of a brake cylinder device constructed in accordance with the invention, and Fig. 2 is a fragmentary plan view of a rubber valve or strainer element included in the apparatus shown in Fig. 1.

As shown in the drawing, the brake cylinder device may comprise a cylindrical casing 5 which is open at one end and closed by a wall 6 at the other, and which has mounted therein a piston assembly 7. The piston assembly comprises a plate or disk element 9 having a plurality of studs 10 welded or otherwise secured thereto, a hollow follower element 11, and an annular gasket 12, which is clamped between the disk member and follower element by means of lock nuts 14 fitted on the studs 10. The follower member 11 has formed thereon a rod portion 16, which extends outwardly of the casing 5, the outermost end of the rod portion being disposed in operating engagement with a brake application member 17 forming part of a brake mechanism such as that disclosed in my aforesaid copending application. It will be understood that the piston assembly 7 is adapted to be operated by the pressure of air applied through a communication 19 to a pressure chamber 20 to effect movement of the brake operating lever 17 to the right, as viewed in Fig. 1, for thereby causing an application of the associated brakes. In the drawing the piston assembly is represented in the release position.

Formed at the non-pressure side of the piston assembly 7 is a chamber 23, through which the piston assembly is adapted to move in effecting an application of the brakes. The outer end of the chamber 23 is closed by a flexible dust shield 25, which may be made of rubber or similar material, and has an inner flange portion 26 clamped by means of rings 27 to the rod portion 16 of the piston assembly and a peripheral portion 28 that is interposed between the annular end surface of the casing 5 and an annular element 29. Suitable bolts 30 are provided for securing the element 29 to the casing 5.

Under normal operating conditions of the piston assembly 7 it is to be expected that a certain amount of fluid under pressure may leak from the pressure chamber 20 to the non-pressure chamber 23. In order to allow such fluid under pressure to escape from the non-pressure chamber 23, the piston follower member 11 is provided with a central chamber 32 which communicates with the non-pressure chamber by way of ports 33 and with the atmosphere by way of a bore 34 formed in the rod portion 16. The bore 34 terminates in a transverse slot 35 formed in the end of the rod portion 16 abutting the brake operating lever 17.

According to the invention, means is provided for preventing access of foreign matter through the bore 34 and chamber 32 to the non-pressure chamber 23, which means comprises a flexible valve element 36 having an annular flange portion 37 securely locked in a suitable groove 38 formed in the follower member 11 by means of an expansion ring 40. The flexible valve element 36 may be made of rubber or similar material and is made in the form of a disk having a normally closed opening preferably formed by intersecting slits 42, as is best shown in Fig. 2 of the drawing.

It will be apparent that when the brake cylinder device shown in Fig. 1 is operated, any fluid under pressure supplied to the pressure chamber 20 and escaping therefrom past the sealing gasket 12 to the non-pressure chamber 23 will be permitted to flow to the atmosphere by way of the ports 33, through the openings 42 provided in the flexible valve element 36 in chamber 32, and thence by way of the bore 34. Since the openings in the valve element 36 are normally closed, however, the admission of foreign matter to the non-pressure chamber of the brake cylinder device is substantially checked. The flexible valve element 36 of course controls the sole communication between the atmosphere and the non-pressure side of the brake cylinder piston, inasmuch as the flexible shield 25 is firmly secured to the piston rod portion 16, thus doing away with the slidable sealing means ordinarily required in the older types of brake cylinders.

Having now described my invention, what I claim as new and desire to secure by Letters Patent, is:

1. In a brake cylinder device, in combination, a cylinder casing having a closed end and an open end, a piston assembly mounted therein and including a follower member carrying a piston rod portion, said piston rod portion being adapted to extend outwardly through said open end of the cylinder casing, a flexible disk or shield having a peripheral portion clamped to said cylinder casing adjacent the open end thereof and an apertured central portion secured to and movable with said piston rod portion, said shield being adapted to close the space at the non-pressure side of said piston assembly, breather means for establishing communication between said space and the atmosphere including a passageway formed in said follower member and the rod portion thereof, and normally closed valve means interposed in said passageway.

2. In a brake cylinder device, in combination, a cylinder casing having a closed end and an open end, a piston assembly mounted therein and including a follower member carrying a piston rod portion, said piston rod portion being adapted to extend outwardly through said open end of the cylinder casing, a flexible disk or shield having a peripheral portion clamped to said cylinder casing adjacent the open end thereof and an apertured central portion secured to and movable with said piston rod portion, said shield being adapted to close the space at the non-pressure side of said piston assembly, and breather means including a flexible valve element mounted within said follower member for permitting escape of fluid under pressure from said space to the atmosphere while normally substantially checking entrance of foreign matter.

3. In a brake cylinder device for a fluid pressure brake, in combination, a cylindrical casing having a closed end and an open end, a flexible diaphragm clamped over said open end and having a central aperture, a movable abutment forming pressure and non-pressure chambers in said casing, said abutment including a member carrying a hollow operating rod adapted to extend through said aperture in the diaphragm, said operating rod having an interior passageway leading from said non-pressure chamber to the atmosphere, and yieldable closure means interposed in said passageway operative to vent entrapped air from said non-pressure chamber while normally substantially checking access of foreign matter thereto by way of said passageway.

4. In a brake cylinder device for a fluid pressure brake, in combination, a cylindrical casing having a closed end and an open end, a flexible diaphragm clamped over said open end and having a central aperture, a movable abutment forming pressure and non-pressure chambers in said casing, said abutment including a member carrying a hollow operating rod adapted to extend through said aperture in the diaphragm, said operating rod having an interior passageway leading from said non-pressure chamber to the atmosphere, a normally closed flexible valve element controlling flow of air through said passageway, and clamping means for holding said element in place.

JOSEPH C. McCUNE.